(12) United States Patent
Rhoads

(10) Patent No.: US 6,225,619 B1
(45) Date of Patent: May 1, 2001

(54) OPTICAL FIBER-BASED IMAGING INSTRUMENT

(75) Inventor: Geoffrey B. Rhoads, West Linn, OR (US)

(73) Assignee: Pinecone Imaging Corporation, West Linn, OR (US)

( * ) Notice: Subject to any disclaimer, the term of this patent is extended or adjusted under 35 U.S.C. 154(b) by 0 days.

(21) Appl. No.: 09/507,877

(22) Filed: Feb. 22, 2000

Related U.S. Application Data

(62) Division of application No. 09/021,853, filed on Feb. 11, 1998, now Pat. No. 6,028,300, which is a continuation-in-part of application No. 08/875,505, filed as application No. PCT/US95/01201 on Jan. 30, 1995, now Pat. No. 6,084,227, said application No. 08/875,505, is a continuation of application No. 08/171,661, filed on Dec. 20, 1993, now Pat. No. 5,448,053, which is a continuation-in-part of application No. 08/024,738, filed on Mar. 1, 1993, now Pat. No. 5,412,200.
(60) Provisional application No. 60/037,541, filed on Feb. 11, 1997.

(51) Int. Cl.[7] .................................................. H01L 31/00
(52) U.S. Cl. ...................................... 250/214.1; 250/203.4; 244/173
(58) Field of Search ............................... 250/214.1, 203.4, 250/203.1, 203.6, 208.1, 227.11; 356/346; 244/173

(56) References Cited

U.S. PATENT DOCUMENTS 5,317,148 * 5/1994 Gray et al. ....................... 250/227.26

* cited by examiner

Primary Examiner—Que T. Le
(74) Attorney, Agent, or Firm—William Y. Conwell

(57) ABSTRACT

An imaging instrument includes plural spaced-apart reflectors, each having an optical fiber end at its focal point. The precise positions of the optical fiber ends are controlled by a control system (e.g., including piezo-electric positioners) that can be operated to counter-act the effect of atmospheric turbulence. The other ends of the fibers terminate at an image plane and serve to provide an output image. Other instruments, employing photon samplers and intensity interferometry techniques, are also disclosed.

6 Claims, 3 Drawing Sheets

Photodetector A

Shape and Breadth of Integrating Function

•Photodetector B•

A Single Value in The Corrected Waveform Corresponds (Proportionaly) To The Total Integrated Brightness Along This Line [ The Integarting Profile Along The Axis Perpendicular To The Line Axis Derives From The System Response of The Two Digitizers ].

OPTICAL FIBER-BASED IMAGING INSTRUMENT

RELATED APPLICATION DATA

This application is a division of application Ser. No. 09/021,853, filed Feb. 11, 1998 (now U.S. Pat. No. 6,028, 300), which claims benefit to U.S. Provisional application No. 60/037,541, filed Feb. 11, 1997, Application 09/021,853 is also a continuation-in-part of application Ser. No. 08/875, 505, filed Jul. 29, 1997, now U.S. Pat. No. 6,084,227, which is the U.S. nationalization of international application PCT/US95/01201, filed Jan. 30, 1995. application Ser. No. 08/875,505 is also a continuation of application Ser. No. 08/171,661, filed Dec. 20, 1993 (now U.S. Pat. No. 5,448, 053), which is a continuation-in-part of application Ser. No. 08/024,738, filed Mar. 1, 1993 (now U.S. Pat. No. 5,412, 200). Priority is claimed to these prior applications under 35 USC Section 120, and the issued patents are incorporated herein by reference.

FIELD OF THE INVENTION

The present invention relates to astronomical imaging, and more particularly relates to methods and apparatuses for astronomical imaging using multiple sensors.

BACKGROUND AND SUMMARY OF THE INVENTION

In accordance with one aspect of the present invention, an astronomical imaging array is formed of several widely spaced photon collectors (e.g. photodiodes). Each collector has associated with it a digitizing sampler that collects a stream of sample data from the photodiode in response to a trigger signal provided by a time source. Samplers at different photon collectors are triggered at different instants in accordance with their spacing, and their relative optical path differences from the object being imaged. In particular, each sampler is triggered to collect a record of samples when a given phase front of light from the object being imaged is expected to pass the photon collector.

Using intensity interferometry techniques, the sampled data from each photon collector is correlated with data from other collectors, yielding a waveform whose individual values represent a brightness line integral through the object. Using different photon collector pairs, different sets of brightness line integrals through the object are produced. Matrix algebra is then employed to synthesize the collected set of line integrals into a two dimensional image representing the brightness of the object being imaged.

Intensity interferometry was invented by Hanbury Brown and Twiss, and is exemplified by the following articles (all by Hanbury Brown et al): "Correlation Between Photons in Two Coherent Beams of Light" (Nature, Vol. 177, pp. 27–29, Jan. 7, 1956); "A Test of a New Type of Stellar Interferometer on Sirius," (Nature, Vol. 178, pp. 1046–48, Nov. 10, 1956); "The Stellar Interferometer at Narrabri Observatory; I: A Description of the Instrument and the Observational Procedure" (Monthly Notices of the Royal Astronomical Society, Vol. 137, pp. 375–392, 1967); and "The Angular Diameters of 32 Stars," (Monthly Notices of the Royal Astronomical Society, Vol. 167, pp. 121–136, 1974). (These articles, and others landmarks in the field of interferometry, are reprinted in the recent volume "Selected Papers on Long Baseline Stellar Interferometry," SPIE Milestone Series, Vol. MS 139, 1997, edited by Lawson.)

No one, to our knowledge, has employed Hanbury Brown-Twiss (HBT) techniques as the basis for an imaging instrument. Instead, astronomical use of such techniques (for forty years) has been limited to the determination of stellar diameters.

We believe one factor contributing to the failure of others to employ HBT techniques in imaging applications may be certain interpretations that are traditionally accorded the original Hanbury Brown papers. We note some possible alternative interpretations that may be central to the functioning of the below-described embodiments.

One area in which HBT's work may have been misunderstood is the common impression that intensity interferometry requires that the two sensors be equidistant from the object being measured (c.f. section 3.3 of their 1967 paper). HBT state that correlation diminishes about 10% with the first 1 nanosecond delay between the two collectors (corresponding to a path length difference of about one foot), and diminishes exponentially as this delay is increased.

(To provide this equidistant spacing, the observatory at Narrabri employed two detectors on a circular track having a radius of about 100 m. By this arrangement, the two detectors could be placed equidistant from the star being measured, while also providing a range of spacing from 0–200 meters.)

We presently believe that intensity interferometry techniques can be used with arbitrarily positioned detectors, including arbitrary three dimensional arrangements (e.g. one or more in space).

Another possible misinterpretation of HBT's original findings is the impression that the variation in correlation, as a function of detector spacing, is a single-lobed function (c.f. FIG. 5 of HBT's 1967 paper), trailing to zero at a normalized spacing of about 3.5. We believe it is likely that this function instead exhibits multiple side lobes, of diminished amplitude, extending far beyond the 0–3.5 range contemplated by HBT. (Our belief is based, in part, on Fraunhofer analysis of the stellar disk being imaged.) The existence of such secondary lobes would begin to suggest that detectors can be spaced much further apart than previously thought possible.

We caution that our foregoing critiques of the HBT work are preliminary but are believed to explain the operation of our detailed embodiment. Further study, however, may reveal other or additional rationales.

Throughout our work we encounter wave/photon conundrums. For example, classical photon theory holds that a single photon can only be sensed once, e.g., when it kicks an electron out of a valence band in a photodiode. Thereafter, it ceases to exist. Yet HBT interferometry seems to illustrate the contrary, by evidencing intensity correlations between spaced-apart optical detectors.

Hanbury Brown and Twiss acknowledged these conundrums, but posed no answer. In the intervening forty years, no satisfactory resolution of the conflicting photon and wave theories has been found. We offer none, and instead rely exclusively on classical wave theory in analyzing operation of our system.

So that the present invention may be better appreciated, it may be helpful to review other work in the field of astronomical interferometry.

Most astronomical interferometry traces its origins back to Michelson's work in the late 1800s. Michelson showed that light from a single source, traveling different paths, can be combined to produce fringe patterns. This is the principle on which modern radio telescope arrays work. For example, the New Mexico Very Long Array (VLA) includes 27 antennas (each with a 25 m reflector) movably positioned within a Y-pattern of up to 22 miles across. The data from each pair of telescopes is combined (often after recording on tape with a time synchronization signal) to form interference patterns. The structures of these patterns, and their changes with time (as the Earth rotates) reflect the structures of radio sources in the sky. By applying Fourier techniques to the resulting interferometric patterns, conventional imagery can be produced. (Such radio astronomy interferometry/imaging is well detailed in extensive literature familiar to those active in the field. A bibliography of writings on the topic can be found at the internet address http:H/sgrajpl.nasa.gov/mosaic_v0.0/Spacevlbi_lib.html.)

The resolution of imagery obtained by such interferometric techniques depends on the size of the array (the baseline). The fully extended VLA, for example, has a resolution of 0.04 arcseconds at 43 GHz. To obtain still better resolution, longer baselines are required. An example of a transcontinental baseline is the Very Long Baseline Array, which employs ten identical radiotelescopes spread from Hawaii to the U.S. Virgin Islands.

A decade ago, first steps were made to extend interferometric baselines still further—into space. During 1986–1988, the NASA TDRSS satellite observatory—working in conjunction with ground-based telescopes in Japan and Australia—proved the feasibility of such systems by recording interferometric fringes from six radioemitting sources.

Several space VLBI (very long baseline interferometry) projects have since been proposed but have not been completed, among them the IVS and QUASAT programs. The costs and difficulties associated with placing complex optical telescopes into orbit played large roles in the demise of these projects.

Just recently, the first fully-operational space VLBI project began operation: the Japanese Institute of Space and Astronautical Science's VSOP mission ("VLBI Space Observatory Program," space antenna deployed Feb. 27, 1997, first fringes produced May, 1997). Another imminent program is the Russian RadioAstron mission, developed by the Astro Space Center of the Lebedev Physical Institute and scheduled for launch later in 1998. Each of these programs utilizes a single 8–10 meter radio telescope in an elliptical Earth orbit, in conjunction with ground radiotelescopes. Each observes in the 22, 5, and 1.6 GHz bands. (Imagery from, and information about, the VSOP mission is publicly available on the world wide web at http://www.vsop.isas.ac.jp/. Information about the RadioAstron mission is publicly available at http://sgra.jpl.nasa.gov/mosaic_v0.0/RadioAstron.html.)

(The movement of an antenna in a space VLBI array, together with the changing path length of the space-to-ground data link, complicates the array's operation. In particular, signals from the moving antenna must be temporally correlated with those from the ground telescopes before they can be combined to generate the interferometric data. However, such problems can be redressed by known techniques described in the literature. To facilitate description of the present invention, an array of fixed photon collectors is described—it being understood that techniques borrowed from this space radiotelescope prior art can be used to compensate for the dynamic effects introduced by placing one or more optical sensors into space.)

The interferometric principles employed in radio telescope arrays can likewise be extended to arrays of optical telescopes. Recent efforts in the optical interferometry domain include the Cambridge Optical Aperture Synthesis Telescope (COAST) and the Sydney University Stellar Interferometer (SUSI).

A further interferometric technique is amplitude interferometry as described, e.g., in Currie et al, "Four Stellar-Diameter Measurements by a New Technique: Amplitude Inteferometry," Astrophysical Journal, Vol. 187(1), Part 1, pp. 131,134 (Jan. 1, 1974). Amplitude interferometry is a variant of Michelson interferometry, designed to better measure stellar diameters in the presence of atmospheric turbulence.

All of the Michelson-based interferometry systems—whether radio or optical—rely on the wave conception of radiation, i.e. that light/radio waves exhibit localized maxima and minima which can be combined to constructively or destructively interfere and produce fringe patterns. This imposes on all such systems a high degree of physical precision (e.g. of sub-wavelength dimension) because received waves must be combined in known phase relationships in order for the resulting fringe patterns to have the desired meanings. At optical wavelengths, for examples, the lengths of connecting optical fibers must be physically or synthetically matched to within millionths of an inch. If such arrays are extended to space (c.f. NASA's New Millenium Interferometer: http://hueyjpl.nasa.gov/nmi/index.html), the locations of the space sensors must be ascertained to the nanometer—a specification which NASA acknowledges will require "a significant capability enhancement."

In contrast, the interferometry aspects of the present invention do not rely on these wavebased constructive/destructive interference forms of interferometry, with their attendant sub-wavelength tolerances. Instead, HBT interferometry is concerned with the correlation of stellar intensity signals over time. The accurate measurement of time is a far easier task than the attainment and maintenance of sub-wavelength physical tolerances. Moreover, the nature of correlation operations is forgiving of many temporal errors (i.e. sample records are time shifted as necessary to obtain optimum correlation, removing small errors in triggering times).

By eliminating the strict physical tolerances inherent in Michelson-based systems, costs are reduced and reliability is increased. Such detectors are thus well adapted for use in arrays whose baselines extend into space. Like Michelson systems, arbitrarily fine angular resolutions can be obtained by spacing the detectors accordingly.

Also disclosed in the following specification, and sharing the attribute of plural spaced detectors, is a more traditional optical imaging system (i.e. no interferometry). This system employs techniques described in the above-cited patents to characterize/model, atmospheric turbulence through which a telescope is seeing.

In accordance with this further aspect of the present invention, these turbulence modeling techniques are used in an array of widely spaced small (e.g. three to twelve inch reflector) telescopes to characterize atmospheric turbulence above each telescope. (Each telescope is pointed at the same general region of the sky.) However, instead of using the resulting data to "unblur" each telescope's imagery, as in the patents' preferred embodiments, it is used to dynamically reposition—at essentially real time (e.g. 100 Hz repositioning)—the end of an optical fiber in each telescope's focal region. Such fibers are run from the plural telescopes to a central collection facility, where their opposite ends terminate in an image plane. This collected group of fiber terminations presents an image that can be viewed directly, or magnified/processed by traditional optics as desired. (Alternatively, the image can be sampled/recorded several times a second, and the resulting static images can be combined to synthesize a more accurate image.)

The foregoing arrangement yields extremely high angular resolution imagery (the exact resolution depends on the extent of the telescope array) while employing inexpensive optical components (e.g. the small component telescopes).

The foregoing and additional features and advantages will be more readily apparent from the following detailed description, which proceeds with reference to the accompanying figures.

DETAILED DESCRIPTION

Figure 1:
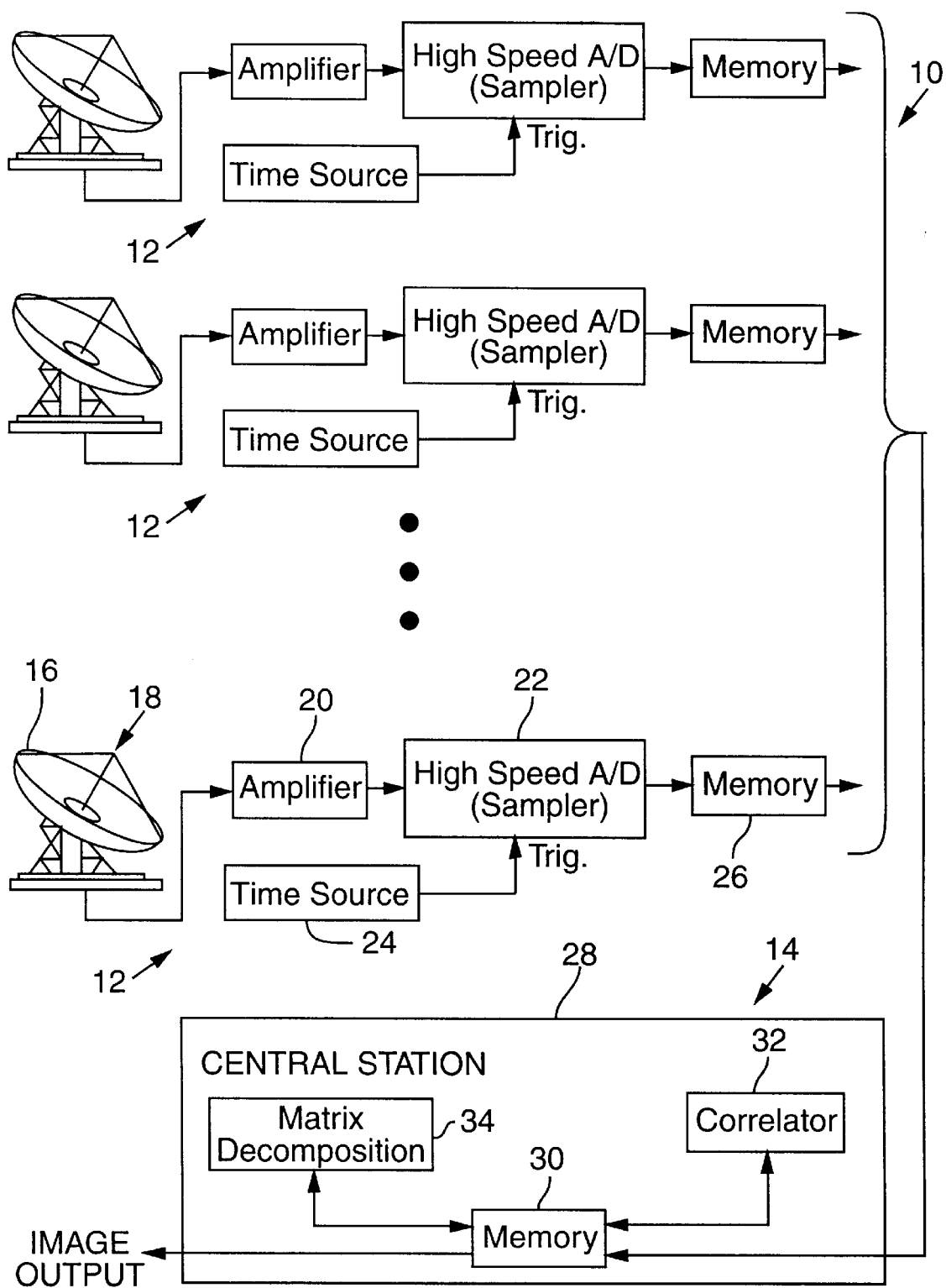
FIG. 1 is a schematic block diagram of an intensity interferometry imaging system according to one embodiment of the present invention.

Referring to FIG. 1, an intensity inteferometry imaging system 10 according to one embodiment of the present invention includes plural spaced-apart photon detection subsystems 12, and a data processing subsystem 14.

Each photon detection subsystem includes a reflector 16, a sensor 18, an amplifier 20, a high speed A/D converter (sampler) 22, a time source 24, and a memory 26.

The reflector 16 in each illustrated photon detection subsystem is a parabolic mirror that serves to collect incident light and direct it onto the sensor 18. The design of the mirror is not critical—its purpose is simply to intercept as many photons as possible from the source being imaged; high precision optics are not required. In the illustrated embodiment, the mirror has a one meter diameter. Smaller or larger mirrors can, of course, be used.

The sensor 18 can take numerous forms, depending on the particular application being served. In the illustrated embodiment, a simple photodiode is used.

The output signal produced by the sensor 18 is provided to an amplifier 20, which scales the signal preparatory to A/D conversion. The illustrated amplifier has a bandwidth of 100 MHz. Such a high bandwidth amplifier is most important for high intensity sources, such as our sun, or for implementations employing very large photon collection mirrors. When imaging fainter objects, or using smaller mirrors, the bandwidth of the amplifier is less critical (e.g. a 10 MHz bandwidth amplifier will suffice for most applications).

The output of amplifier 20 is provided to the input of a fast A/D sampler 22. A 1 GHz digital oscilloscope (available from Tektronix) is used in the illustrated embodiment; many other devices can likewise be used. The digital oscilloscope produces 8-bit output samples, quantifying the instantaneous amplifier output on a scale of 0–255. 16- or 32-bit sampling devices can of course be used.

The digitized output samples from the sampler 22 are written into memory 26. Due to the 1 GHz sample rate, data is provided to the memory 26 at a rate of 1 megabyte per millisecond, so a fairly large memory is desirably employed. A 32 megabyte memory, for example, can store a total of 32 million samples (spanning a total sampling time of 32 milliseconds).

The digitizing operation of sampler 22, and the writing of data into memory 26, is initiated by a trigger signal provided to a triggering input of the digital oscilloscope. This triggering signal is provided from the time source 24.

Digressing a moment, a quasi-hypothetical wavefront of light from the astronomical object being imaged will reach different of the photon detection subsystems 12 at different times, depending on their physical locations. ("Quasi-hypothetical" simply pays homage to the equivocation surrounding the concept of an optical wavefront.) The purpose of the time source 24 is to synchronize the acquisition of sample data at each of these detection subsystems relative to a common wavefront.

For example, if two detection subsystems 12 are positioned a kilometer apart on a north-south line, and are used to image a star 45 degrees above the horizon, due south, the relative geometry indicates that light from the star will reach the northern detection subsystem 2.35 microseconds after it reaches the southern detection subsystem. If the time source 24 at the southern detection subsystem is set to trigger its data acquisition at time T, the time source at the northern detection subsystem should be set to trigger its data acquisition at time T+2.35 microseconds.

In the illustrated embodiment, each sampler 22 is triggered such that the center of its data record coincides with the arrival of a singular quasi-hypothetical optical wavefront emanating from the center of the object. In simpler terms, each digitizer is triggered to end half a record length time after the arrival of the singular wavefront, producing half the data record before arrival and half after arrival. Precision and accuracy issues produce some small variations about this ideal "half."

In the preferred embodiment, the triggering time for each detection subsystem is programmed from a central control station 28 (which typically houses the data processing subsystem 14), and is relayed to the subsystems by telephone or wireless data communication. Sampling then begins when the local time source reaches the specified time. (The end of sampling is also controlled by a signal from the time source, a programmable interval after the sampling starts.) In other embodiments, direct control of the triggering operations can be effected from the central station 28, e.g. through matched fiber optic lines. In some applications, Doppler-compensated triggering times may be used.

Time sources 24 in the illustrated embodiments are Global Positioning System receivers, designed to receive time data from the array of 26 GPS satellites in low earth orbit. The time signals available to civilians from the GPS satellites are accurate only to about 100 nanoseconds. Authorized government users can decode the time signals to produce data accurate to within 10 nanoseconds. Accuracy better than the 100 nanosecond civilian standard can be achieved by averaging several intervals of the 100 nanosecond-accurate clock signals.

Although FIG. 1 shows just a few photon collection subsystems 12, in actual practice dozens, hundreds, or thousands of such subsystems are employed. Also, the clipart of FIG. 1 suggests a fairly sophisticated collection system. In practice, simpler is generally better. The main criteria for the reflector/sensor are (1) collecting as many photons as practicable, and (2) ensuring—to the degree practicable—that light received by a sensor emanates only from the object being imaged. (Realistically, it suffices if light is collected from a small neighborhood around the object being imaged.) Desirably, the reflector/sensor should also permit tracking of the target object as the earth rotates, although this is not essential.

Generally speaking, no spectral filtering is performed; every photon helps. (There are situations in which limited filtering may be appropriate. An example is the differential phase shifts that different wavelengths of light may experience as they travel through different columns of the earth's atmosphere to different of the photon collection subsystems. Such vagaries may be reduced by filtering out certain wavelengths prior to the sensor.)

The photon detection subsystems 12 can be sparsely arrayed in relative random placements, or systematically arrayed, or some combination—driven as much by the randomness of human population center locations as anything else, with typical pair-distances being anywhere from a few hundred meters to thousands of kilometers or much, much larger still.

It is desirable to have extremely long record lengths in the samplers 22, with relatively fast transfers to mass storage, facilitating high repetition rates in the acquisition of finite segment waveforms. In an illustrative embodiment, 5,000–10,000 samples are acquired each time a photon collection subsystem 12 is triggered. Desirably, tens, hundreds, or thousands of such data records are acquired within a brief interval. This interval should generally be as short as possible, usually less than a second. (Depending on the processing capabilities of the photon detector subsystem, a thousand 10,000 sample records might be acquired in 50 milliseconds or less.) These extras sets of waveforms are collected in order to increase the signal to noise ratio in the ultimate resulting image, assuming that the total collecting time is short enough so that the object changes inappreciably.

The data from the memories 26 is transferred to the data processing subsystem 14 for post processing.

Data processing subsystem 14 is illustrated as including a memory 30, a correlator 32, and a matrix decomposition element 34. Although dedicated hardware can be used for these latter two elements, other embodiments implement these functions in software on a general purpose computer.

Data records from each of the memories 26 is copied into memory 30, which is suitably large for this purpose. Memory 30 desirably includes disk storage for storing the complete set of input data, together with a large random access memory for storing data records currently being processed.

Correlator 32 performs standard correlation operations between data records produced by selected pairs of photon detector subsystems 12. Such correlation, when applied to any pair of waveforms produced by the same optical wavefront, results in a new waveform whose individual values each represents a total brightness line integral through the object, where the line in question is perpendicular the line axis drawn between the given pair of detector subsystems. This will be more readily apparent by reference to FIGS. 2 and 3.

Figures 2, 3:
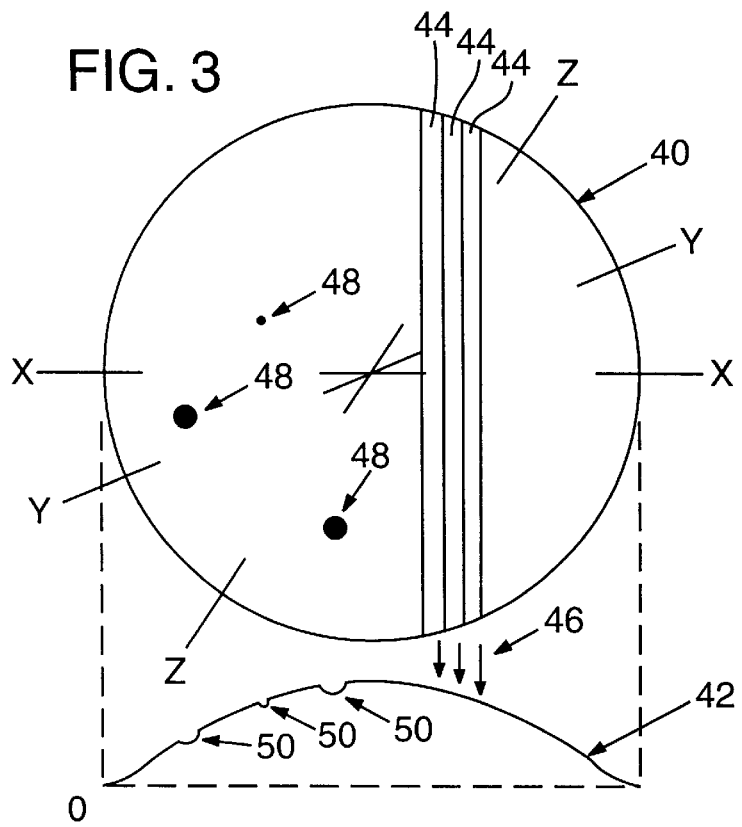
FIG. 2 is a diagram showing the geometrical relationship between a pair of detectors, and a line integral across the object being observed, in the system of FIG. 1.
FIG. 3 is another view showing how a line integral relates to features on the object being imaged.

FIG. 3, for example, shows the correspondence between a star 40 being imaged, and a brightness line integral 42 (not to scale) corresponding thereto. Line integral 42 is produced by correlator 32 in response to data records produced by a pair of photon detector subsystems whose axis is parallel to line X—X through the star 40. Different vertical "bands" 44 are illustrated through star 40, with arrows 46 showing the portions of the line integral 42 corresponding thereto.

If star 40 were of uniform brightness across its extent, brightness line integral 42 would be a smooth, sinusoidal function, beginning at zero at the end of the disk, growing to a maximum value, and then tapering off to zero at the opposite end of the disk.

In reality, the star 40 is not of uniform brightness. The illustrated star, for example, has dark splotches 48 (e.g. sunspots). These irregularities in the star's brightness are manifested as irregularities 50 in the brightness line integral 42.

It will be recognized that the positions of irregularities 50 in the brightness line integral 42 indicate one dimension of the splotches' position on the stellar disk (i.e. the left/right position in the figure). However, line integral 42 does not provide any data about the splotches' position in the other dimension (up/down). But by correlating a different pair of data records, from a pair of detection subsystems oriented along a different axis, a different brightness profile can be obtained, e.g. one along line Y—Y. Similarly, yet another pairing can provide brightness data along line Z—Z, etc.

By processing the different line integrals produced by correlator 32, along different axes through the object being imaged, the position of surface features on object 40 can be determined. While two orthogonal line integrals theoretically contain all the information needed to fully resolve the two dimensional image brightness profile, in practice, many such brightness line integrals are collectively processed to obtain this data.

The collective processing of the different brightness line integrals to yield the two dimensional brightness data is performed by the matrix decomposition element 34. It will be recognized that the brightness value at any position (x,y) on the object 40 can be determined by examining the projection of point (x,y) onto each of the different line integrals 42 (i.e. along line X—X, along line Y—Y, along line Z—Z, etc.), and solving the associated linear equations to determine what brightness value would yield the observed values at each of the projected points.

As noted earlier, each time source has some inherent error (e.g. 1–100 nanoseconds). However, when correlating thousands of sets of data samples, a self consistency about where each waveform exists relative to the others emerges. This self-consistency allows the sets of data samples to be matched to within one sample period (i.e. 1 nanosecond). The time error associated with each set of data samples can then be determined.

The post-processing operations detailed above were expressed in the earlier-filed provisional application as follows:

A section of the correlated waveform, generally centered in the data record to some degree of accuracy, thus contains a set of such (contiguous) line integral values, essentially covering the object in total, with some overlap between line integrals related to the sampling rates of the digitizers. Except in extremely high resolution imaging where slight dynamic rotation of the axes are often desired (as in very distant object imaging), the collected set of correlation waveforms from the, e.g. one minute set, can be added to effect a higher signal to noise ratio set of covering line integral values. It can be appreciated that a second pair of detectors will produce a second set of covering line integrals in the identical fashion, with, in general, a different orientation and spacing (spacing being a function of the lateral distance between photodetectors and the sampling rates of the digitizers [here assumed equal]). Likewise, a third pair and a fourth pair and a fifth pair and so on each produce a generally unique set of line integral values, until all combinations of pairs are exhausted.

The entire set of line integrals thus represents a rather simple system of linear equations (with certain basic "bias" differences compensated for) over any garden variety set of image basis functions (such as square pixels), a system whose solution produces an image of the object where the resolution ("pixel spacing") of the resulting image is generally equivalent to the breadth of a line integral provided there are sufficient numbers of pair combinations and sufficient rotation orientation randomness to ensure a full independent set of linear equations. For example, 50 scattered photodetectors with sufficiently large separations should be capable of producing a 1K by 1K image.

It will be recognized that imaging system 10 provides high resolution imagery, with extremely simple sensors. Moreover, the data processing needed to generate the imagery is straightforward and does not involve, e.g., the Fourier (or other domain) transformations required in radio astronomy and the like.

Figure 4:
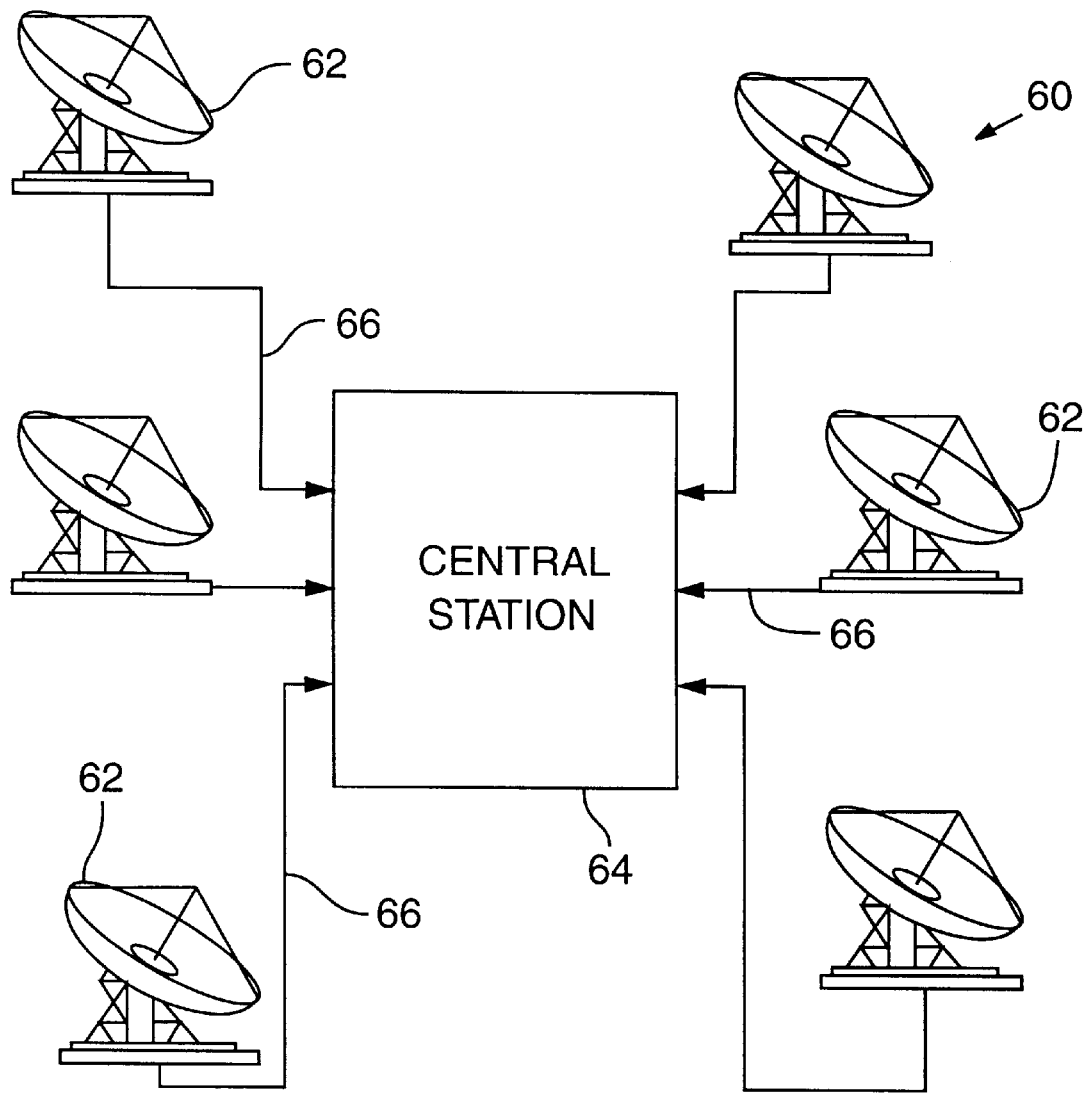
FIG. 4 is a schematic block diagram of another multi-sensor imaging system according to another embodiment of the present invention.

Turning now to FIG. 4, a different form of spaced-sensor astronomical imaging system is shown.

The FIG. 4 system 60 includes plural telescopes 62, each equipped with a system to characterize the atmospheric distortion through which the telescope is viewing. Such a system is disclosed in the earlier-cited patents. The outputs from the telescopes 62 are combined by a central station 64 to produce the final image.

Desirably, each of the telescopes 62 is fairly small (e.g. less than a meter) so that the tips/tilts of received wavefronts are not too complex. (If large reflectors are used, more complex atmospheric distortion results.) In an exemplary system, the reflectors are on the order of the Fried distance, $r_o$ or less.

The telescope outputs which make up the final image are not two-dimensional sets of image data. Rather, they are single mode optical fibers 66 which couple light from a single point in the telescope's focal region. The fiber end at the telescope (typically planar) is adaptively moved within this focal region by a three-dimensional piezo electric positioning system, in response to real-time data about the turbulence of the atmosphere through which the telescope is viewing (e.g. repositioned 100 times per second). This positioning system maintains the fiber end at the point where light from the source being imaged is focused, regardless of how intervening atmospheric turbulence may cause this point to shift.

More particularly, each telescope 62 includes a dichroic mirror between the reflector and the fiber end. The mirror couples light into a fast (e.g. 100 frame/second) camera using, for example, a 512×512 pixel CCD (e.g. of the sort described in U.S. Pat. No. 5,444,280, incorporated herein by reference). Data from this CCD is used, in accordance with the disclosure of the earlier-cited patents, to produce tip/tilt data for a region, e.g., a half degree across. (A half degree of space usually includes sufficient bright stars to provide meaningful tip/tilt data.) This tip/tilt data determines the movement of the fiber end.

At the central station, the other ends of these fibers are terminated in an image plane. This collected group of fiber terminations presents an image that can be viewed, recorded, or processed as desired. For example, the image can be projected, using glass lenses, onto a viewing screen. Alternatively, the image can be sampled/recorded several times a second, and the resulting static images combined to synthesize a more accurate image, e.g. by a weighted average or the like. (Weighting can be advantageously employed because the turbulence characterizing system can assess the relative merit of each recorded frame by reference to the turbulence at that instant. The weight given to any image frame can be inversely proportional to the degree of turbulence under which the image was produced.)

It is important that the optical path lengths from the object being imaged, to the termini of the fibers at the central station, be matched. The fiber lengths coupling the telescope feed points to the central station can be made equal. But additional optical delay must be provided to account for the differing path length from the object to each of the telescopes.

This additional optical delay can be provided by various means. One suitable arrangement is to interrupt the fiber from each telescope and interpose a fiber optic delay line. An arrangement much like a pair of cooperating rotary electrical switches can be employed. In particular, the fiber from the telescope can terminate at the periphery of a rotatable disk. Radially arrayed about this disk are first ends of plural delay lines. The disk can be rotated so as to couple light from the end of the telescope fiber into any of these delay lines.

A reciprocal arrangement is used on the second part of the interrupted fiber. That end is routed to the periphery of a second rotatable disk, which has the second ends of the optical delay lines radially arrayed therearound. The two disks are turned to couple light into, and out of, the desired one of the delay lines. (A variety of optical and mechanical considerations come into play in the implementation of this system including, e.g., how to utilize index matching fluids between the fiber ends when the fiber ends are physically movable. Such details are within the capabilities of an artisan in the optical fiber field.)

A similar arrangement can be employed in which the optical delay lines do not terminate radially at the periphery of the disk, but rather are normal thereto and near the edge thereof. The interrupted telescope optical fiber can be terminated near the edge of the disk to couple into and out of such delay lines.

In alternative embodiments, electro-optic techniques can be used to switch the light through different delay elements. Still further, at such time as analog optical delay devices become commonplace (e.g. devices which control the refractive index of a media in response to a control signal), they can be employed to advantageous effect.

Starlight collected by the telescopes is desirably used to aid in matching of the optical path lengths using, e.g., conventional Michelson interferometric techniques. Gross precision (e.g. on the order of a millimeter or a centimeter) is achieved by the physical components. Adjustments can then be made, e.g., by servo mechanisms which reposition each of the telescopes 62 in three dimensions, to fine tune match the optical path lengths.

As in the FIG. 1 embodiment, the telescopes 62 can be arrayed in any fashion over an arbitrarily large area. (Current single mode fiber technology presently limits the distribution of the telescopes to a maximum distance of about 100 kilometers from the central station 64. As improvements are made to the fibers, further separations will become practical.)

Due to the wide distribution of the telescopes 62, the turbulence of the atmosphere can be tomographically modeled over a similarly wide area. This information can be advantageously used, for example, by aviation authorities who can use it to direct aircraft to areas of low turbulence. (Turbulence data will be spotty at low altitudes if the telescopes are widely spaced, since the viewing cones of each will not overlap until higher altitudes. If such a system is employed for aviation purposes, it would be desirable to have more closely spaced telescopes around the periphery of the array. This would permit identification of low altitude turbulence as it moves into (and out of) the area monitored by the array.)

From the foregoing, it will be recognized that system 60 provides real-time imaging of astronomical objects using inexpensive component telescopes. The angular resolution provided by the system depends on the dimensions of the telescope array; exceedingly high resolutions are possible.

Having described the principles of our invention with reference to preferred embodiments and several variations thereof, it should be apparent that the embodiments can be modified in arrangement and detail without departing from such principles. Accordingly, we claim as our invention all such modifications as may come within the scope and spirit of the following claims, and equivalents thereto.

What is claimed is:

1. In an instrument for imaging an object, an improvement comprising plural detectors, each including a shaped reflector for collecting incident radiation and redirecting same to a focal region, each detector further including an optical fiber having a terminus in the focal region, each detector further including a positioning apparatus that moves the terminus within the focal region in accordance with a control signal, the other ends of each of said optical fibers being collected to provide an output signal.

2. The instrument of claim 1 which further includes an atmospheric turbulence modeling system for generating the control signals in accordance with modeled atmospheric turbulence.

3. The instrument of claim 2 in which the atmospheric turbulence modeling system comprises each of said detectors, data therefrom being used to model atmospheric turbulence in an expanding field of view extending from said reflector, turbulence from said detectors being collectively used to model turbulence over the entire instrument.

4. The instrument of claim 1 in which the positioning system moves the terminus in three dimensions, rather than just two.

5. The instrument of claim 1 in which the positioning system includes a piezo electric actuator.

6. The instrument of claim 1 comprising at least three detectors, arrayed in a non-collinear fashion.

* * * * *